(12) United States Patent
Chang et al.

(10) Patent No.: US 10,128,924 B2
(45) Date of Patent: Nov. 13, 2018

(54) PROXIMITY ACTIVATED ANTENNA SWITCH SYSTEM AND METHOD THEREFOR

(71) Applicant: Dell Products, LP, Round Rock, TX (US)

(72) Inventors: Ching-Wei Chang, New Taipei (TW); I-Yu Chen, Taipei (TW)

(73) Assignee: DELL PRODUCTS, LP, Round Rock, TX (US)

( * ) Notice: Subject to any disclaimer, the term of this patent is extended or adjusted under 35 U.S.C. 154(b) by 186 days.

(21) Appl. No.: 14/312,129

(22) Filed: Jun. 23, 2014

(65) Prior Publication Data
US 2015/0372735 A1 Dec. 24, 2015

(51) Int. Cl.
*H04B 7/02* (2018.01)
*H04B 7/06* (2006.01)
*H04B 7/0413* (2017.01)

(52) U.S. Cl.
CPC ......... *H04B 7/0608* (2013.01); *H04B 7/0413* (2013.01)

(58) Field of Classification Search
CPC ..... H04L 1/0618; H04L 1/06; H04L 25/0204; H04L 27/2601; H04L 1/0025; H04B 7/0417; H04B 7/0669; H04B 1/40; H04B 3/23; H04B 1/403
USPC .......................... 375/267, 260, 259, 295, 316
See application file for complete search history.

(56) References Cited

U.S. PATENT DOCUMENTS

| 8,577,289 | B2 | 11/2013 | Schlub et al. | |
|---|---|---|---|---|
| 2002/0035438 | A1* | 3/2002 | Prince | 702/77 |
| 2006/0200034 | A1* | 9/2006 | Ricci et al. | 600/513 |
| 2011/0250928 | A1* | 10/2011 | Schlub | H01Q 1/243 455/550.1 |
| 2012/0214412 | A1 | 8/2012 | Schlub et al. | |
| 2013/0315076 | A1* | 11/2013 | Zhao | H04B 7/082 370/252 |
| 2014/0269977 | A1* | 9/2014 | Yang | H04B 1/3838 375/295 |

FOREIGN PATENT DOCUMENTS

WO WO 2012/112275 A1 8/2012

OTHER PUBLICATIONS

"Wieson's P-SENSOR Efficiently Reduce the SAR from Handheld Device," Wireless Application Business Unit, May 14, 2012, 2 pgs., http://www.wieson.com/go/en/wieson/news_show.php?nid=12392 &catalog=Product%20News.
"802.11n Demystified—Key considerations for n-abling the Wireless Enterprise," Motorola White Paper, 802.11nDEM_WP_v4_0209, 12 pgs, Feb. 2009, http://www.motorolasolutions.com/web/Business/_Documents/White%20Paper/_Static%20files/802%2011nDEM_WP_v4_0209.pdf.

* cited by examiner

*Primary Examiner* — Zewdu Kassa
(74) *Attorney, Agent, or Firm* — Larson Newman, LLP

(57) ABSTRACT

A state of a detection signal received from a proximity detector is determined. The first proximity detector is incorporated with a primary antenna at an information handling system. The proximity detector can assert the detection signal in response to detecting that an object external to the information handling system is located close to the proximity detector. A second antenna is coupled to a wireless communication circuit at the information handling system if the detection signal is asserted.

20 Claims, 5 Drawing Sheets

PROXIMITY ACTIVATED ANTENNA SWITCH SYSTEM AND METHOD THEREFOR

FIELD OF THE DISCLOSURE

This disclosure generally relates to information handling systems, and more particularly relates to proximity activated antenna switching.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Technological advancements have made it possible to provide powerful information handling systems in mobile and hand-held devices.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
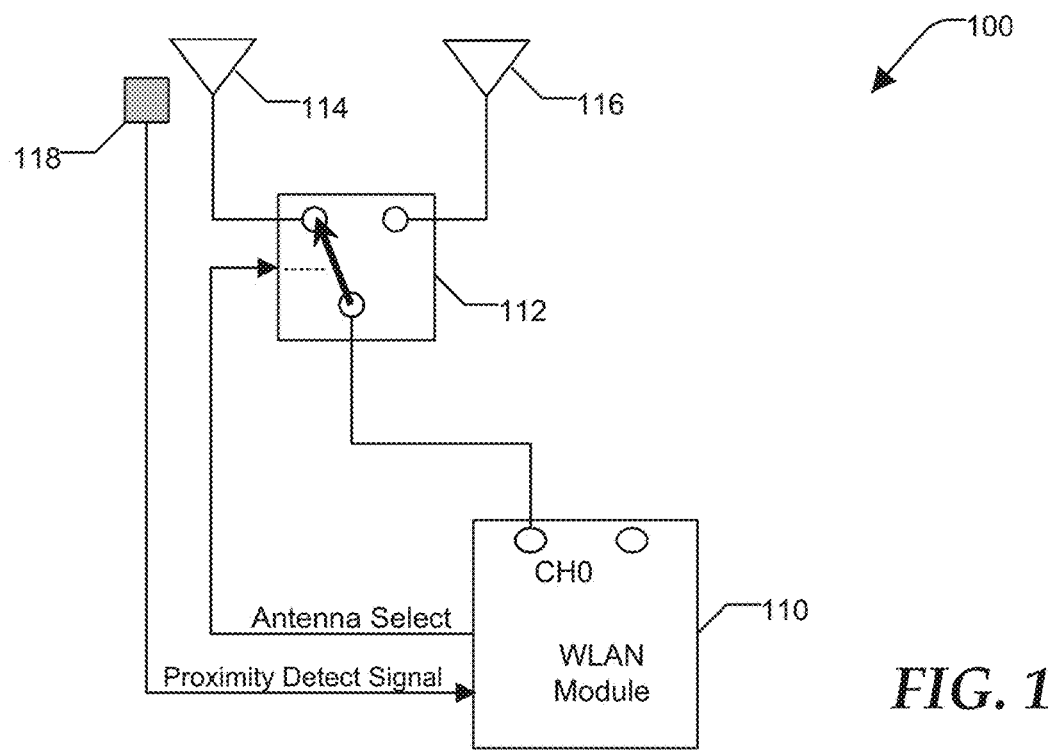
FIG. 1 is a block diagram illustrating an antenna selection system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

An information handling system can include one or more interfaces for communicating with another system over a network. Portable devices typically include a wireless interface that supports transmission and reception of information using radio-frequency. A wireless communications interface, such as a wireless local area network (WLAN) links two or more devices using some wireless distribution method. Signals are transmitted and received using one or more radio-frequency antennas included at the device. The wireless interfaces generally operate at relatively high frequencies, such as in excess of one gigahertz. Antennas operating at these frequencies can be very small and often are installed inside the device. It is possible for a user to hold the device with their hand or body covering the internal antenna structure, which can result in poor wireless performance because signals transmitted or being received by the antenna are partially or substantially blocked by the user. FIGS. 1-6 illustrate techniques for selecting an alternate antenna when a primary antenna is obstructed.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

FIG. 1 shows an information handling system 100 according to a specific embodiment of the present disclosure. For example, the information handling system 100 can be a tablet computer, a lap-top computer, a cellular telephone device, or another device that includes a wireless communication system. System 100 includes a wireless local area network (WLAN) module 110, a radio-frequency (RF) switch 112, a primary antenna 114, an alternate antenna 116, and a proximity detector 118. The WLAN module 110 includes a single radio chain, and is also referred to herein as a wireless communication circuit. While a WLAN communications transceiver is illustrated, the techniques disclosed herein are applicable to another type of data communication device or another radio-frequency transceiver technology, such as a 4G Long-Term Evolution (LTE) cellular radio transceiver. The RF switch 112 is configured to couple the WLAN module 110 to only one of antenna 114 and antenna 116 at any particular moment. The RF switch 112 includes an input for receiving an antenna select signal from the WLAN module 110. For example, the RF switch 112 can be configured to couple antenna 114 to the CH0 input of the WLAN module when the WLAN module 110 negates the antenna select signal, and to couple antenna 116 to the CH0 input of the WLAN module 110 when the WLAN module 110 asserts the antenna select signal.

Antenna 114 and antenna 116 are ideally positioned within the information handling system 100 remotely from each other. For example, antenna 114 can be located on the top left corner of the system 100 and antenna 116 can be located the top right corner of the system 100. Alternatively, antenna 114 can be located at the top of the system 100 and antenna 116 can be located at the bottom of the system 100, or another configuration can be utilized. By separating the placement of the antennas in this manner, the likelihood that a user's hand will simultaneously impinge on RF transmission from both antennas is reduced. The proximity detector 118 is configured to detect that an object is located external to the system 100 and within a specific distance of the detector. For example, the proximity detector 118 can be configured to detect that a user's hand is adjacent to the location of the detector. The proximity detector 118 is located close to the primary antenna 114, and therefore more distant from the alternate antenna 116. For example, the proximity detector 118 can be incorporated with the structure of the antenna 114. As used herein, a proximity detector is said to be incorporated with an antenna if the proximity detector is installed in the immediate vicinity of the antenna, adjacent to the antenna, coincidental to the antenna, or the like. In one embodiment, the proximity detector 118 is a capacitance detector configured to provide a detection signal in response to an increase or change in the capacitance of an element included at the detector. Another type of detector technology that is suitable for detecting objects that are in proximity of the detector, and a corresponding antenna, can be utilized.

Figure 2:
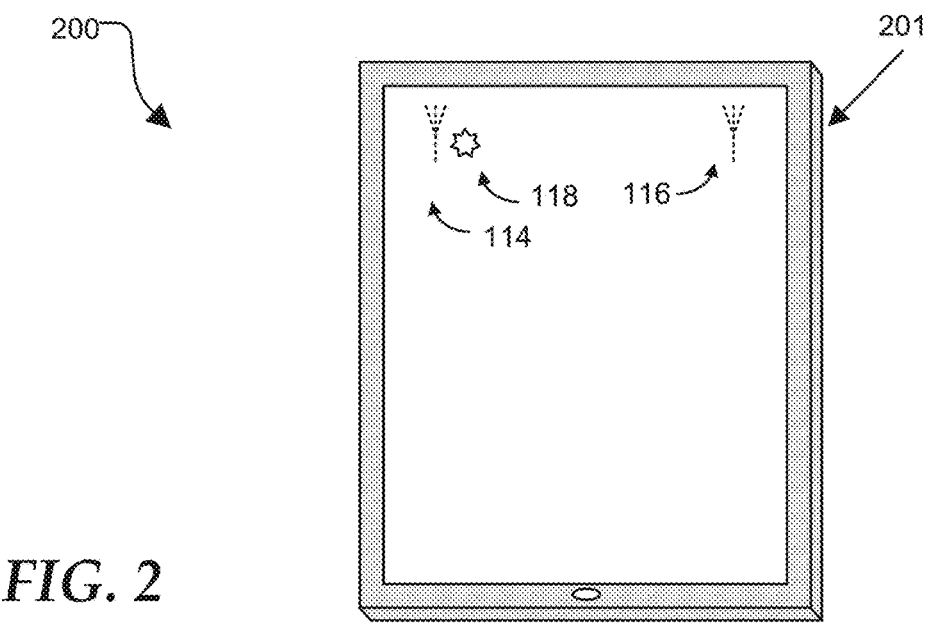
FIG. 2 is a frontal view of an information handling system including the antenna selection system of FIG. 1 according to a specific embodiment of the present disclosure.

FIG. 2 illustrates an information handling system 200, such as a tablet computer, a cellular telephone, or the like, according to an embodiment of the present disclosure. The system 200 can include a housing 201, a display surface 202. A primary antenna 114, a corresponding proximity detector 118, and an alternate antenna 116 are situated inside the housing 201 and therefore are not visible to a user of the system. During operation, a user's hand, holding the system 200, may be situated at or near the primary antenna 114. In this case, the proximity detector 118 can signal the WLAN module 110, and in response, the module 110 can configure the RF switch 112 to select the alternate antenna 116. While FIG. 2 shows two antennas, additional antennas can be included at the system 200, as described below.

Returning to FIG. 1, the proximity detector 118 is configured to assert the proximity detect signal if an object is in proximity of the detector. In an embodiment, the sensitivity of the proximity detector 118 can be manipulated. For example, the WLAN module can include a comparator to compare a magnitude of a signal provided by the proximity detector to a predefined reference value. The reference level, such as a reference voltage, can be adjusted to regulate the sensitivity of the detector. Accordingly, the proximity detector 118 can be said to assert the proximity detect signal if the signal voltage received from the detector is equal to or exceeds the reference voltage. Similarly the proximity detector can source or sink a current that is relative to the proximity of an object to the detector. Accordingly, a comparator at the WLAN module 110 can be configured to compare a current instead of signal voltage. The reference value can be programmable. For example, the reference value can be determined based on a data value stored at a register.

During operation, the RF switch 112 is configured to couple antenna 114 to the WLAN module 110 unless an object is detected by the proximity detector 118, at which time the WLAN module directs the RF switch to couple the alternate antenna 116 to the module. In one embodiment, the WLAN module 110 can re-select the primary antenna 114 if the proximity detector 118 no longer detects an objet in proximity to the antenna 114. In another embodiment, the WLAN module 118 can return operation to the primary antenna based on additional considerations. For example, the WLAN module 118 can wait a defined interval of time after the proximity detector no longer detects an object before directing the RF switch to re-select the primary antenna 114. For another example, the WLAN module 118 can re-select the primary antenna 114 based on a received signal strength indicator identifying poor reception using the alternate antenna 116. For still another example, the WLAN module 118, having received an indication that the object is no longer in proximity of the primary antenna 114, can complete transmission or reception that is underway before re-selecting the primary antenna. In another embodiment, a second proximity detector (not shown at FIG. 1) can be incorporated at the second antenna, and the radio-frequency switch 112 can be configured to couple the WLAN module 110 to the primary antenna 114 or to the alternate antenna 116 based on a magnitude of the proximity detect signal provided by proximity detector 118 relative to a magnitude of a corresponding proximity detect signal provided by the second detection signal. The magnitude of each of the proximity signals can indicate how close one or more objects are to a corresponding proximity detector, or indicate a degree that each antenna is obstructed.

In one embodiment, a level of transmission power maintained after switching from the primary antenna 114 to the alternate antenna 116 in response to the assertion of the proximity detection signal can be the same as the level of transmission power prior to the assertion of the detection signal. In another embodiment, a level of transmission power maintained after switching from the primary antenna 114 to the alternate antenna 116 in response to the assertion of the proximity detection signal can be greater than the level of transmission power prior to the assertion of the detection signal.

Figure 3:
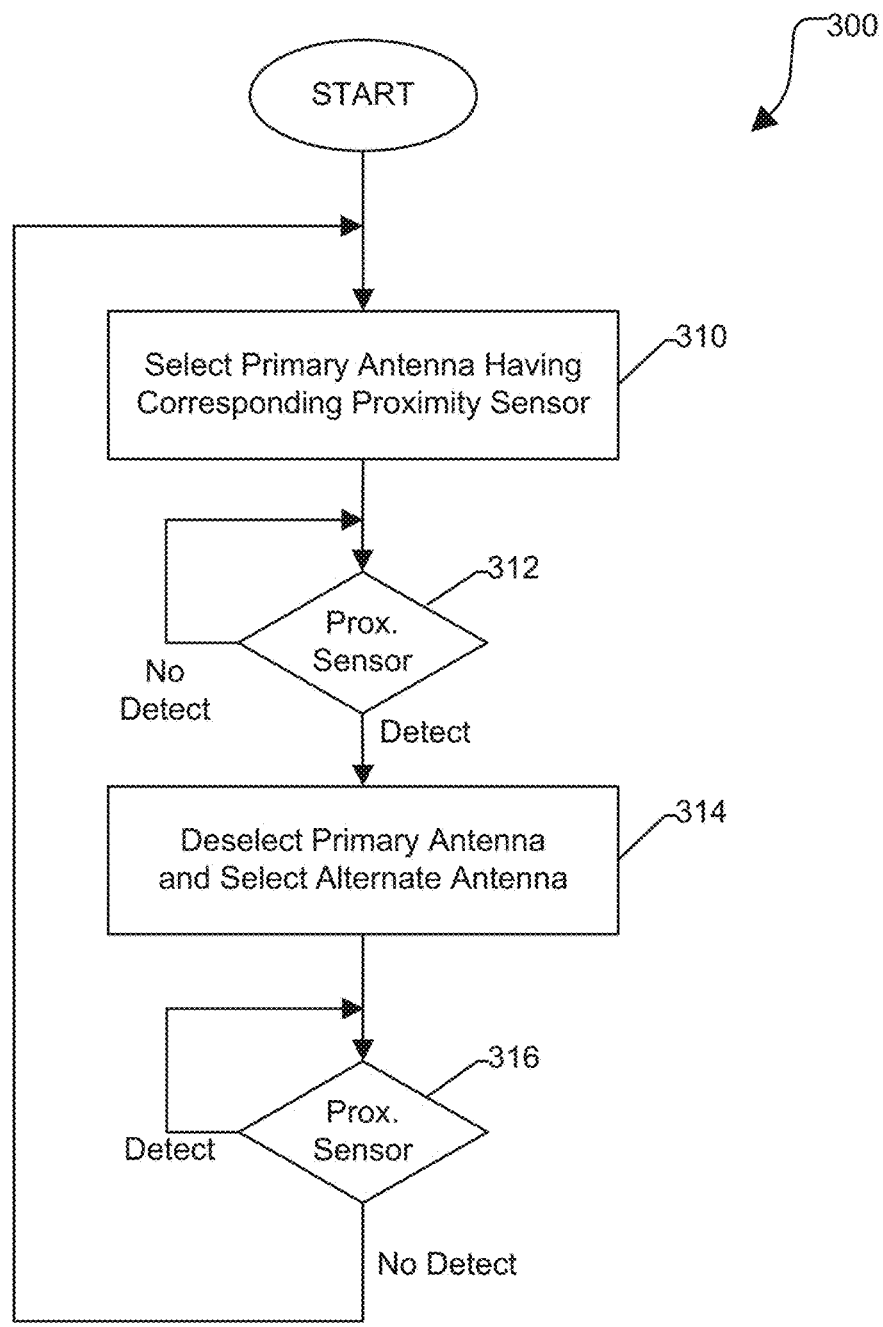
FIG. 3 is a flow diagram illustrating a method according to a specific embodiment of the present disclosure.

FIG. 3 is a flow diagram illustrating a method 300 for selecting a wireless communications antenna according to a specific embodiment of the present disclosure. The method 300 begins at block 310 where a primary antenna is initially activated. For example, a wireless transceiver, such as the WLAN module 110 can configure an RF switch, such as the RF switch 112, to couple the primary antenna 114 to the CH0 input of the module 110. As described above, a proximity detector, such as proximity detector 118, is located near the primary antenna 114. The method continues at the decision block 312 where it is determined whether an object is in proximity of the detector. For example, if the proximity detector 118 does not detect an object, the method continues to wait for an assertion of the proximity detect signal. If an object is detected near antenna 114, the proximity detection signal is asserted. The method continues at block 314 where the primary antenna is deselected and an alternate antenna is selected. For example, the WLAN module 110, having determined that the proximity detect signal is asserted, asserts the antenna select signal. In response to assertion of the antenna select signal, the RF switch 112 transitions from coupling the primary antenna to the module 110 to instead coupling the alternate antenna to the CH0 input of the module 110. The method continues at the decision block 316 where it is again determined whether an object is in proximity of the detector. As long as the proximity detect signal is asserted, the alternate antenna remains selected. If the proximity detect signal is negated, indicating the object is no longer in the vicinity of the primary antenna 114, the WLAN module 110 can negate the antenna select signal, causing the RF switch 112 to re-select the primary antenna. As described above, the WLAN module 110 can return operation to the primary antenna based on de-assertion of the proximity detect signal and further in response to other criteria.

Figure 4:
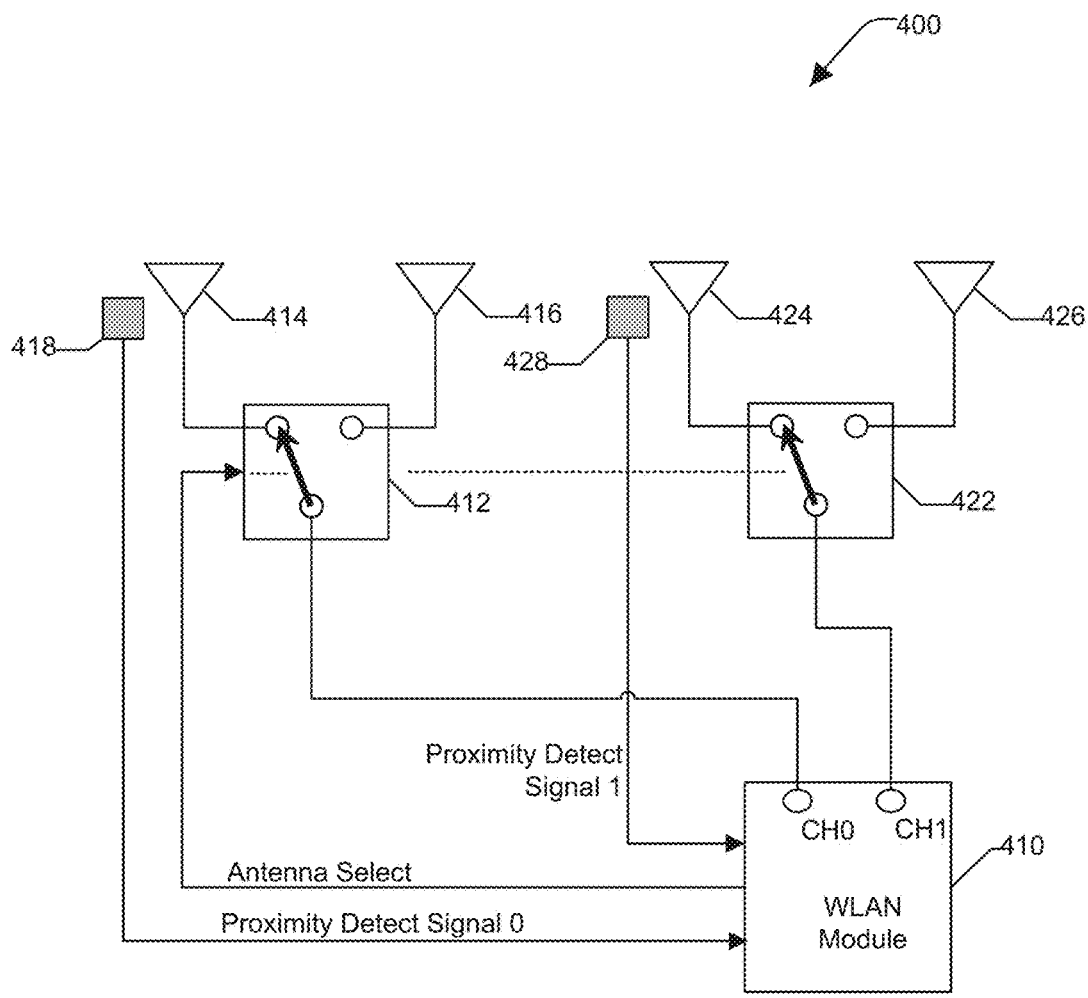
FIG. 4 is a block diagram illustrating an antenna selection system according to another embodiment of the present disclosure.

FIG. 4 shows an information handling system 400 according to another embodiment of the present disclosure. System 400 includes a WLAN module 410 that includes two radio chains, corresponding to terminals CH0 and CH1, respectively. System 400 includes two RF switches, RF switch 412 and RF switch 422. RF switch 412 is coupled to a primary antenna 414 and an alternate antenna 416. RF switch 422 is coupled to a primary antenna 424 and an alternate antenna 426. A proximity detector 418 is incorporated with the primary antenna 414 and a proximity detector 428 is incorporated with the primary antenna 424, similar to proximity detector 118 and primary antenna 114 described above. Also similar to system 100 described above, the primary antenna 414 and the alternate antenna 416 are ideally positioned within the information handling system 400 remotely from each other. Similarly, primary antenna 424 can be located remotely from the alternative antenna 426.

During operation, the proximity detector 418 is configured to assert a proximity detect signal 0 if an object, such as a user's hand, is located near the proximity detector 418 and the corresponding primary antenna 414. Similarly, the proximity detector 428 is configured to assert a proximity detect signal 1 if an object is located near the proximity detector 428 and the corresponding primary antenna 424. In one embodiment of the present disclosure, assertion of either of proximity detect signal 0 or proximity detect signal 1 can cause the WLAN module to assert an antenna select signal. The antenna select signal is coupled to both RF switch 412 and RF switch 422. Assertion of the antenna select signal causes RF switch 412 to de-select primary antenna 414 and select alternate antenna 416, and causes RF switch 422 to de-select primary antenna 424 and select alternate antenna 426. In other words, assertion of the antenna select signal will result in CH0 of the WLAN module 410 being coupled to the alternate antenna 416, and will result in CH1 of the module 410 being coupled to the alternate antenna 426. As described above, primary antennas 414 and 424 are selected, by default, if the antenna select signal is not asserted.

The operation described above can be achieved by performing a logical-OR of proximity detect signal 0 and proximity detect signal 1. Accordingly, assertion of either one or both of the detect signals will result in the assertion of the antenna select signal. In another embodiment, assertion of the antenna select signal can be based on a logical-AND function of proximity detect signal 0 and proximity detect signal 1, so that the antenna select signal is only asserted if both proximity detector 418 and proximity detector 428 detect an object within a predetermined distance of primary antenna 414 and primary antenna 424.

WLAN module 410 can be configured to support Multiple Input Multiple Output (MIMO) technology to improve communications performance. MIMO systems can utilize space-division multiple access (SDMA), orthogonal frequency-division multiple access (OFDMA), and the like. A MIMO system can utilize spatial processing, and also may include diversity coding. A MIMO system has multiple radio chains each of which is a transceiver with its own antenna. A radio chain refers to the hardware necessary for transmit/receive signal processing. A MIMO radio can apply techniques to enhance signal quality and deliver more through-put. A MIMO system has multiple RF chains implemented in the radio allowing the processing of multiple RF signals from multiple antennas. Depending on the number of transmit/receive antennas and the number of spatial streams, a MIMO system is often classified as a T×R:S system. Under this nomenclature T refers to the number of transmit antennas, R refers to the number of receive antennas and S refers to the number of spatial streams (transmitted data streams) the system can process. For example a 3×3:2 system can transmit and receive 2 data streams on its 3 antennas.

WLAN module 110 and 410 can be configured to support antennas diversity. Diversity switching logic implemented at the WLAN module decides when to switch between a primary and a secondary (diversity) antenna for receiving the best signal. A signal from only one antenna is used at any time. In an embodiment of the present disclosure, the antenna select signal can be asserted based on assertion of one or more proximity detect signals and based on a diversity protocol.

Figure 5:
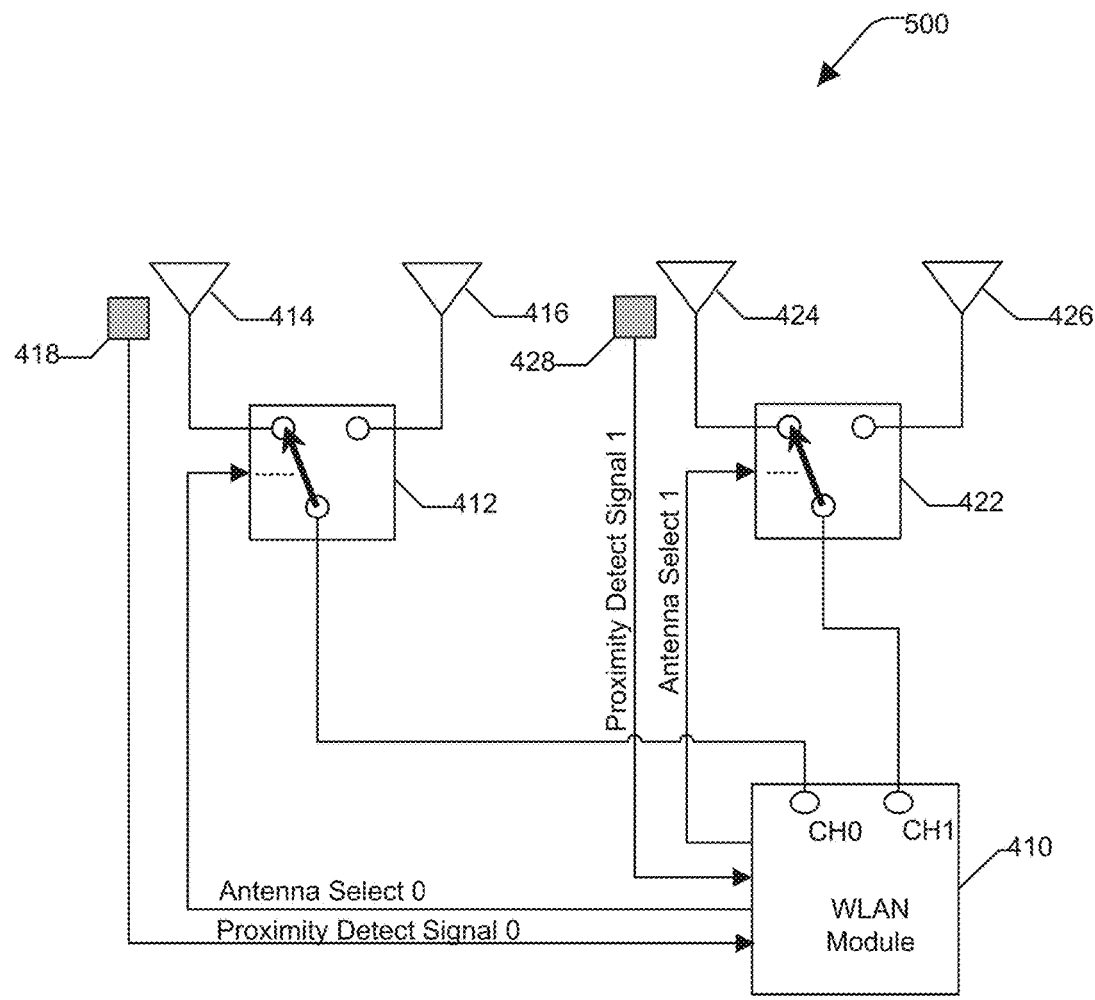
FIG. 5 is a block diagram illustrating an antenna selection system according to still another embodiment of the present disclosure.

FIG. 5 shows an information handling system 500 according to another embodiment of the present disclosure. System 500 is similar to system 400 of FIG. 4 with one exception; system 500 includes two antenna select signals. In one embodiment, WLAN module 410 can assert antenna select signal 0 in response to assertion of the proximity detect signal 0, and can assert antenna select signal 1 in response to assertion of the proximity detect signal 1. In another embodiment, WLAN module 410 can assert antenna select signal 0 and antenna select signal 1 in response to assertion of the proximity detect signal 0. In still another embodiment, WLAN module 410 can assert antenna select signal 0 and antenna select signal 1 in response to assertion of the proximity detect signal 1. The WLAN module 410 may support MILO, antenna diversity, received signal strength indicator (RSSI), or other RF transceiver technology in addition to operations described above regarding proximity detectors 418 and 428.

Figure 6:
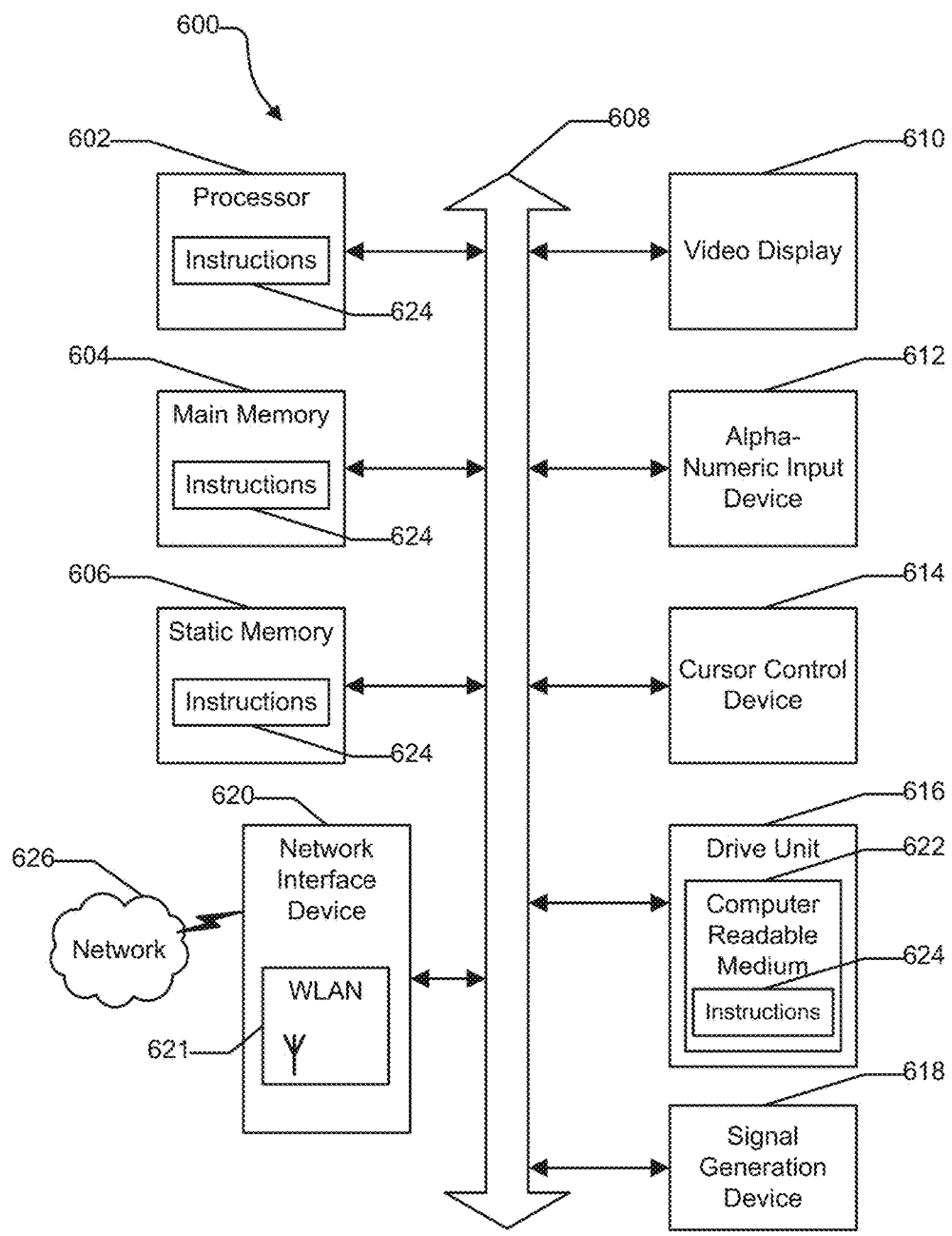
FIG. 6 is a block diagram of an information handling system according to an embodiment of the present disclosure.

FIG. 6 shows an information handling system 600 capable of administering each of the specific embodiments of the present disclosure. The information handling system 600 can represent the information handling system 200 of FIG. 2. The information handling system 600 may include a processor 602 such as a central processing unit (CPU), a graphics processing unit (GPU), or both. Moreover, the information handling system 600 can include a main memory 604 and a static memory 606 that can communicate with each other via a bus 608. As shown, the information handling system 600 may further include a video display unit 610, such as a liquid crystal display (LCD), an organic light emitting diode (OLED), a flat panel display, a solid state display, or a cathode ray tube (CRT). Additionally, the information handling system 600 may include an input device 612, such as a keyboard, and a cursor control device 614, such as a mouse. The information handling system 600 can also include a disk drive unit 616, a signal generation device 618, such as a speaker or remote control, and a network interface device 620 to provide communications over a network 626. The network interface device 620 can include a WLAN module 621, similar to WLAN modules 110 and 410 described above. The information handling system 400 can represent a server device whose resources can be shared by multiple client devices, or it can represent an individual client device, such as a desktop personal computer.

The information handling system 600 can include a set of instructions that can be executed to cause the computer system to perform any one or more of the methods or computer based functions disclosed herein. The computer system 600 may operate as a standalone device or may be connected such as using a network, to other computer systems or peripheral devices.

In a networked deployment, the information handling system 600 may operate in the capacity of a server or as a client user computer in a server-client user network environment, or as a peer computer system in a peer-to-peer (or distributed) network environment. The information handling system 600 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 600 is illustrated, the term "system" shall also be taken to include any collection of systems or sub-systems that individually or jointly execute a set, or multiple sets, of instructions to perform one or more computer functions.

The disk drive unit 616 may include a computer-readable medium 622 in which one or more sets of instructions 624 such as software can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the information handling system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal; so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
  a first antenna;
  a second antenna;
  a wireless communication circuit;
  a proximity detector incorporated with the first antenna, the proximity detector to assert a detection signal in response to detecting that an object external to the information handling system is located within a first distance from the proximity detector, the proximity detector comparing the detection signal to a sensitivity value; and a radio frequency switch configured to couple the wireless communication circuit to the first antenna if the detection signal is less than the sensitivity value, and to couple the wireless communication circuit to the second antenna if the detection signal equals or exceeds the sensitivity value.

2. The system of claim 1, wherein a level of transmission power maintained after switching from the first antenna to the second antenna in response to the assertion of the detection signal is greater than the level of transmission power prior to the assertion of the detection signal.

3. The system of claim 1, further comprising discontinuing transmission at the first antenna in response to the detection signal equaling or exceeding the sensitivity value.

4. The system of claim 1, wherein the wireless communication circuit includes only one radio chain operable to transmit and receive, the radio chain coupled to the radio frequency switch.

5. The system of claim 1, wherein the wireless communication circuit is configured to control the radio frequency switch to reselect the first antenna based on a received signal strength indication.

6. The system of claim 1, wherein the first proximity detector is a capacitive proximity detector.

7. The system of claim 1, further comprising:
a third antenna;
a fourth antenna; and
a second proximity detector incorporated with the third antenna, the second proximity detector to assert a second detection signal in response to detecting that an object external to the information handling system is located within a second distance from the second proximity detector;
wherein the radio-frequency switch is further configured to couple the wireless communication circuit to the third antenna if the second detection signal is not asserted, and to couple the wireless communication circuit to the fourth antenna if the second detection signal is asserted.

8. The system of claim 7, wherein the wireless communication circuit supports Multiple-input/Multiple-output (MIMO) technology.

9. The system of claim 1, wherein the first distance is determined based on a programmable value.

10. The system of claim 1, wherein the wireless communication circuit further comprises:
a second proximity detector incorporated with the second antenna, the second proximity detector to assert a second detection signal in response to detecting that an object external to the information handling system is located within a second distance from the second proximity detector;
wherein the radio-frequency switch is further configured to couple the wireless communication circuit to one of the first antenna or the second antenna based on a magnitude of the first detection signal relative to the second detection signal.

11. A method comprising:
determining a detection signal received from a proximity detector, the proximity detector incorporated with a first antenna at an information handling system and configured to assert the detection signal in response to detecting that an object external to the information handling system is located within a first distance from the proximity detector;
comparing the detection signal to a reference value; and
activating a radio frequency switch having two positions, a first position of the two positions connecting a second antenna to a wireless communication circuit at the information handling system in response to the detection signal being less than the reference value, and a second position of the two positions disconnecting the first antenna from the wireless communication circuit in response to the detection signal equaling or exceeding the sensitivity value, the second antenna without an incorporated proximity detector.

12. The method of claim 11, further comprising:
deactivating the radio frequency switch, causing the switch to couple the first antenna to the wireless communication circuit and to decouple the second antenna from the wireless communication circuit in response to determining the detection signal is less than the reference value.

13. The method of claim 11, further comprising increasing a level of transmission power previously provided at the first antenna, to the second antenna, after coupling the second antenna to the wireless communication circuit.

14. The method of claim 11, further comprising discontinuing transmission at the first antenna in response to the detection signal equaling or exceeding the reference value.

15. The method of claim 11, further comprising:
determining a state of a second detection signal received from a second proximity detector, the second proximity detector incorporated with a third antenna at the information handling system, the second proximity detector to assert the second detection signal in response to detecting that an object external to the information handling system is located within a second distance from the second proximity detector; and
coupling the second antenna to the wireless communication circuit at the information handling system in response to determining the second detection signal is asserted.

16. The method of claim 15, further comprising:
coupling the third antenna to the wireless communication circuit in response to determining the second detection signal is not asserted; and
coupling a fourth antenna to the wireless communication circuit at the information handling system in response to determining the second detection signal is asserted.

17. An information handling system comprising:
a first antenna including a first proximity detector, the first proximity detector to assert a first detection signal in response to detecting that an object external to the information handling system is located within a first distance from the first proximity detector;
a second antenna, the second antenna not including a proximity detector;
a third antenna including a second proximity detector, the second proximity detector to assert a second detection signal in response to detecting that an object external to the information handling system is located within a second distance from the second proximity detector;
a fourth antenna, the fourth antenna not including a proximity detector;
a wireless communication circuit including a first radio chain and a second radio chain;
a first radio frequency switch to couple one of the first antenna or the second antenna to the first radio chain based on the first detection signal and the second detection signal exceeding a sensitivity value; and a second radio frequency switch to couple one of the third antenna or the fourth antenna to the second radio chain based on the first detection signal and the second detection signal.

18. The system of claim 17, wherein the first radio frequency switch is configured to couple the second antenna to the first radio chain in response the first detection signal equaling or exceeding the sensitivity value.

19. The system of claim 17, wherein the first radio frequency switch is configured to:
couple the second antenna to the first radio chain in response to the second detection signal equaling or exceeding the sensitivity value; and
couple the fourth antenna to the second radio chain in response to the second detection signal equaling or exceeding the sensitivity value.

20. The system of claim 17, wherein the first radio frequency switch is further to switch connectivity of the first radio chain from the second antenna to the first antenna in response to determining that the first detection signal is no longer asserted.

* * * * *